Patented Aug. 15, 1939

2,169,363

UNITED STATES PATENT OFFICE 2,169,363

OLEFIN-SULPHUR DIOXIDE REACTION PRODUCTS

Carl Shipp Marvel and Donald Sherwood Frederick, Urbana, Ill.; said Frederick assignor to said Marvel No Drawing. Application April 29, 1936, Serial No. 77,022

14 Claims. (Cl. 260—94)

This invention relates to polymeric reaction products and more particularly to the compositions obtainable by the reaction of sulphur dioxide with olefins. This application is directed to processes in which the aforementioned condensation is carried out in the presence of aldehydic catalysts.

It was known at least as early as 1898 that sulphur dioxide would add to some olefinic compounds (Sononina, J. Russ. Phys. Chem. Soc. 30, 826 and Chem. Zentr. 1, 248). A great deal of literature on this reaction has appeared since that time. Present knowledge of the reaction between olefinic compounds and sulphur dioxide indicates that olefins in which one or more hydrogen atoms are replaced by such substituents as halogen, cyano and carboxyl react difficultly or not at all with sulphur dioxide. Olefins containing phenolic, aldehyde and ester groups are similarly non-reactive. Alcoholic hydroxyl groups in the olefins ordinarily do not interfere with the formation of a polymeric reaction product with sulphur dioxide, but it has been found that oleyl alcohol does not form such a condensation product. Experience predicates such an exception on the location of the double bond in the molecule.

The results, obtainable by processes reported prior to this invention, are erratic and the described processes are uneconomical and time-consuming. The principal object of the present invention was the production of a resinous composition having properties fitting it for commercial use, for cheap, easily available raw materials, by an inexpensive process. Other objects were the production of olefin-sulphur dioxide polymers in a very desirable physical and/or chemical form and in a high state of purity by simple and convenient methods. Still further objects were to devise new chemical and/or physical processes, to produce new chemical and/or physical compounds, to discover new catalyst for the sulphur dioxide-olefin condensation reaction and to discover means and methods whereby reproducible results could be obtained in the production of olefin polysulphones. A general advance in the art and other objects which will appear hereinafter were also contemplated.

With the foregoing objects and related ends in view, it has been discovered that commercially valuable olefin polysulphones (i. e., polymeric olefin-sulphur dioxide addition products) can be obtained by contacting sulphur dioxide, in the presence of an aldehyde, with an olefin of the formula

in which X represents hydrogen, methyl or hydroxymethyl, Y represents hydrogen, methyl or hydroxymethyl, and Z represents hydrogen or an alkyl group, which alkyl group may have one or more hydrogen atoms replaced by a hydroxyl or cyclo aliphatic hydrocarbon radical, and in which Y and Z together may represent a saturated divalent hydrocarbon radical containing less than seven carbon atoms provided, however, that Y, X and Z are not all alkyl groups.

An understanding of the invention will be furthered by a consideration of the following detailed description and illustrative specific examples. Throughout the specification and claims quantities are given by weight unless otherwise indicated.

Example I

Thirty-three (33) parts by volume of liquid sulphur dioxide and 33 parts by volume of liquid propene (propylene) were placed in a well-cooled pressure container and to the mixture there was added 4 parts by volume of paraldehyde. The container was sealed and allowed to warm up to room temperature. After about 2 hours it was cooled and opened. The reaction product was finely ground in a mortar, washed with two 50 parts by volume portions of diethyl ether and dried. The yield was about 40 parts by weight (80% of theoretical) of a white amorphous solid which, upon analysis, was found to contain 30.10% sulphur as compared to a calculated amount of 30.19% for a polysulphone of the formula $$(C_3H_6SO_2)_n$$

The product of this example began to decompose when heated to about 250° C. It dissolved slowly in concentrated nitric acid and in concentrated sulphuric acid and was recovered (apparently unchanged) by pouring such acid solutions into a large volume of water. It was insoluble in the usual organic solvents including diethyl ether, ethyl alcohol, ethyl acetate, petroleum ether, carbon tetrachloride, chloroform, acetic anhydride, dioxan, acetone, acetyl chloride and benzene.

Example II

Ten (10) volumes of liquid pentene-2 and 10 volumes of liquid sulphur dioxide were mixed together in a pressure container and to the mixture there was added one volume of paraldehyde and one volume of 3% hydrogen peroxide. The container was sealed and the mixture allowed to stand for about 12 hours. The polymeric product was isolated by pouring the reaction mixture into water, the precipitated polymer being purified by thoroughly washing first with ethyl alcohol, then with diethyl ether. A 75% yield of a hard white amorphous substance soluble in acetone and melting at 290°–300° C. (Bloc Maquenne) was obtained. It was soluble in acetone and could be precipitated therefrom by adding the acetone solution to water. Upon analysis the product was found to contain 44.37% carbon and 7.20% hydrogen as compared with calculated amounts of 44.8% and 7.46% for a polysulphone of the formula $(C_5H_{10}SO_2)_n$.

Example III

Ten (10) volumes of liquid 3-cyclohexylpropene-1 and 10 volumes of liquid sulphur dioxide were mixed together in a pressure container and to the mixture there was added one volume of paraldehyde and one volume of 3% hydrogen peroxide. The container was sealed and the mixture allowed to stand for about 12 hours. The polymeric product was isolated by pouring the reaction mixture into water and was purified by thoroughly washing first with ethyl alcohol and then with diethyl ether. A 75% yield was obtained. The product melted at 330° C. (Bloc Maquenne). Upon analysis, it was found to have 56.95% carbon and 8.56% hydrogen, whereas the calculated amounts for a polysulphone of the formula $(C_6H_{11}C_3H_5SO_2)_n$ are 57.5% and 8.50%, respectively.

Example IV

Ten (10) volumes of liquid 2-methylpropene and 10 volumes of liquid sulphur dioxide were mixed together in a pressure flask and one volume of 3% aqueous hydrogen peroxide added. The flask was then sealed and the mixture allowed to stand for twelve hours. It was opened and one volume of paraldehyde added to the reaction mixture, the container then being sealed and allowed to stand for about one hour. The reaction product was isolated by pouring the reaction mixture into water. Thorough washing with ethyl alcohol followed by diethyl ether served to purify the polymeric material obtained. 2-methylpropene polysulphone, a white amorphous powder, quite brittle and insoluble in common organic solvents, was obtained in a 75% to 90% yield. This product melted at 340° C. (Bloc Maquenne). Upon analysis it was found to have 39.6% carbon and 7.0% hydrogen, whereas the calculated amounts for a polysulphone of the formula $(CH_3C_3H_5SO_2)_n$ are 40.0% and 6.66%, respectively.

Example V

Ten (10) volumes of liquid pentene-1 and 10 volumes of liquid sulphur dioxide were mixed together in a pressure flask and one volume of 3% aqueous hydrogen peroxide added. The flask was then sealed and the mixture allowed to stand for twelve hours. It was opened and one volume of paraldehyde added to the reaction mixture, the container then being again sealed and allowed to stand for about one hour. The reaction product was isolated by pouring the reaction mixture into water. Thorough washing first with ethyl alcohol, then with diethyl ether served to purify the polymeric material obtained. A yield of 80-90% was obtained. This product was soluble in acetone and could be purified by pouring the acetone solution into water, thereby precipitating the polymer. It melted at 340° C. (Bloc Maquenne) and was found upon analysis to have 43.4% carbon and 7.68% hydrogen, the calculated values for a polysulphone of the formula $C_5H_{10}SO_2)_n$ being 44.8% and 7.46%, respectively.

Example VI

Ten (10) volumes of liquid nonene-1 and 10 volumes of liquid sulphur dioxide were mixed together in a pressure flask and one volume of 3% aqueous hydrogen peroxide added. The flask was then sealed and the mixture allowed to stand for twelve hours. It was opened and one volume of paraldehyde added to the reaction mixture, the container then being again sealed and allowed to stand for about one hour. The reaction product was isolated by pouring the reaction mixture into water. Thorough washing first with ethyl alcohol, then with diethyl ether, served to purify the polymer. A yield of 75% was obtained. This polysulphone is soluble in acetone and can be further purified by adding the acetone solution to water and thereby precipitating the polymer. Upon analysis, this product was found to contain 56.8% carbon and 8.86% hydrogen, whereas the calculated amounts present in a polysulphone of the formula $(C_9H_{18}SO_2)_n$ are 57.0% and 9.47%, respectively. This polymer was quite plastic at 200° C. and decomposed slowly at 300° C. It was softer and more plastic than the polymers from shorter chain olefins.

A further variation of the present invention lies in the discovery that alcohols, while not exerting in themselves any positive catalytic effect on the reaction between olefins and sulphur dioxide, are valuable as adjuvants or promoters for aldehyde catalysts, increasing their activity. When the catalyst composition contains both an aldehyde and an alcohol, not only is the yield improved but the polymer obtained is also more nearly white and more stable than that formed when the alcohol is omitted. Even minute traces of the alcohol produce detectable results.

Example VII

Twenty (20) parts by volume of cyclohexene, 5 parts by volume of ethyl alcohol, and 1 part by volume of paraldehyde were placed in a pressure flask, the mixture cooled to −50° C., and 20 parts by volume of liquid sulphur dioxide added. The flask was then closed, allowed to stand for twenty hours at room temperature, cooled to −20° C. and opened. The reaction product, a viscous mass, was dissolved in 50 parts by volume of chloroform and the cyclohexene-sulphur dioxide polymer precipitated by the addition thereto of a large volume of diethyl ether. The polymer was then filtered, dried, powdered in a mortar, washed thoroughly with diethyl ether, again filtered and finally dried. A yield of 8 parts by weight was obtained. This example was repeated omitting the alcohol and a yield of only 4 parts by weight was obtained. When both alcohol and aldehyde were omitted, a yield of only one part of polymer resulted.

Polycyclohexene sulphone obtained as described above is soluble in chloroform, tetrachloroethane and the common acid chlorides, such as acetyl chloride. It is somewhat soluble (to the extent of about 4 or 5%) in ortho-dichloro-benzene, bromobenzene, dioxan and nitrobenzene. It is insoluble in other common organic solvents such as diethyl ether, ethyl alcohol, carbon tetrachloride, ethyl acetate, acetic anhydride and petroleum ether. Toluene and acetone soften the polymer somewhat without dissolving it. It is insoluble in water, dilute acids and dilute alkalies. It dissolves slowly in concentrated sulphuric acid with the formation of a viscous, colorless solution from which the polymer may be recovered unchanged by pouring the solution into cold water. The addition of a little dibutyl phthalate to a solution of the polymer in chloroform gives a solution which when flowed out on glass or metal surfaces and allowed to dry forms a soft flexible film.

Table I infra is a tabulation of the results described in Example VII and results obtained by following the same procedure with varying proportions of aldehydes and alcohols. In each instance cyclohexene was used as the olefin so that a direct comparison of the results is possible.

Table I

| Alcohol | | Aldehyde | | Yield, parts by weight |
|---|---|---|---|---|
| Species | Parts by volume | Species | Parts by volume | |
| | None | | None | 1 |
| | None | Paraldehyde | 1 | 4 |
| Ethyl | 5 | do | 1 | 8 |
| n-Butyl | 5 | do | 1 | 8 |
| Ethyl | 5 | n-Heptaldehyde | 1 | 3 |
| Do | 5 | Benzaldehyde* | 2 | 7 |
| Do | 5 | do** | 1 | 28 |
| Glycol | 20 | Paraldehyde | 1 | 28 |
| Ethyl | 5 | Para-formaldehyde | 0.5w | 8.5 |
| Do | 5 | Terephthal-aldehyde | 2w | 11.5 |
| Do | 5 | do | 1w | 7 |

* Sample comparatively fresh.
** Sample having stood several months in a loosely stoppered bottle.
w Parts by weight.

*Example VIII*

To further illustrate the action of alcohols as assistants, comparative experiments, carried out with propene, are tabulated in Table II below. The procedure followed in each instance was as follows:

Eighteen (18) volumes of propene and the amount of aldehyde and/or alcohol indicated in Table II were placed in a pressure flask, cooled to —50° C. and 20 volumes of liquid sulphur dioxide added. The flask was then closed, allowed to stand for twenty hours at room temperature, cooled to —20° C. and opened. The reaction product, a viscous mass, was dissolved in 50 volumes of chloroform and the propene sulphur dioxide polymer precipitated by the addition of a large volume of di-ethyl ether. The polymer was then filtered, dried, powdered in a mortar, washed thoroughly with di-ethyl ether, again filtered and finally dried. The yields obtained are summarized in Table II.

Table II

| Alcohol | | Aldehyde | | Yield, parts by weight |
|---|---|---|---|---|
| Species | Parts by volume | Species | Parts by volume | |
| Ethyl | None | Paraldehyde | 1 | Small amount. |
| Do | 5 | do | 1 | 23. |
| | 5 | | None | None. |
| | None | | None | None. |

The properties of the poly propone sulphone are described in Example I above.

Desirable results are obtained by the simultaneous use of an aldehyde, an alcohol and hydrogen peroxide as catalysts for the olefin-sulphur dioxide condensation.

*Example IX*

Twenty (20) parts by volume of cyclohexene, 20 parts by volume of sulphur dioxide, 3 parts by volume of 3% hydrogen peroxide, 5 parts by volume of ethyl alcohol, and 1 part by volume of paraldehyde were placed in a pressure flask which was then sealed and allowed to come to room temperature over a period of several hours. The polymeric reaction product was then isolated in the manner described in the preceding examples, a yield of 32 parts by weight being obtained. The properties of the cyclohexene polysulphone secured were the same as those noted in Example VII. Repetition of this example with omission of the alcohol resulted in the formation of only 11 parts by weight of polymer.

*Example X*

Twenty (20) volumes of liquid pentene-2, 20 volumes of liquid sulphur dioxide, 1 volume of paraldehyde, 5 volumes of ethyl alcohol and 3 volumes of 3% hydrogen peroxide were placed in a pressure container which was then sealed and allowed to come to room temperature over a period of several hours. The polymeric reaction product was isolated in the manner disclosed in the preceding examples. A yield of 15 parts by weight was obtained. This polymer is soluble in acetone and may be purified by reprecipitation therefrom in water as pointed out in Example II.

In practicing the present invention, any olefin having the general formula given above may be used. Olefins which merit special mention are propene, pentene-2, 3-cyclohexylpropene-1, 2-methylpropene, pentene-1, nonene-1, cyclohexene, ethylene, 3-methylcyclohexene, octene-2, allyl alcohol, undecylenyl alcohol $$CH_2=CH-(CH_2)_8CH_2OH$$

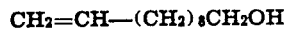

butene-1, and octene-1.

Commercial sulphur dioxide can be used satisfactorily in the present invention. If particular purification is desired this can be accomplished by bubbling the gas through concentrated sulphuric acid.

The proportions of sulphur dioxide to olefin can be varied as desired since an excess of either reactant can be removed from the reaction products without undue difficulty. Since the olefin and sulphur dioxide react in equimolecular proportions, it is desirable (for the sake of economy) to use them in that ratio.

The particular catalytic composition utilized to most advantage in the preparation of the olefin-sulphur dioxide polymeric reaction products and the best manner of its application depend to a large extent upon the specific olefin being treated. The catalyst may consist of one or more aldehydes or one or more aldehydes in conjunction with an alcohol or a mixture of alcohols. One or more aldehydes may also be used with hydrogen peroxide. If desired the hydrogen peroxide and alcohol (or alcohols) may both be present with the aldehydic material. When the catalyst is a composite one, the components thereof may be added to the materials to be condensed, jointly or severally in any desired order.

The invention is not limited to use of any particular aldehyde or aldehydes. Paraldehyde, benzaldehyde and terephthalaldehyde are the preferred catalysts. Others such as para-formaldehyde, propionaldehyde, isobutyraldehyde, heptaldehyde, phthalaldehyde, p-toluic aldehyde, and the like warrant special mention. Partially oxidized paraldehyde is especially effective. Partially oxidized benzaldehyde, for example, benzaldehyde which has been allowed to stand exposed to air for some time at ordinary room temperatures, gives excellent results. The proportions of aldehyde used as a catalyst may be varied within wide limits though generally a volume of aldehyde of 5–10% of the volume of the olefin is preferred.

So far as is known, all alcohols act to at least some extent as adjuvants for the aldehyde catalysts. The alcohol may be primary, secondary or tertiary and may belong to any one of the aliphatic, cycloaliphatic or aromatic series. The saturated aliphatic alcohols having up to five or six carbon atoms, such as ethanol, propanol, butanol, isopropanol, isobutanol, glycol and the like, have been found most effective. Alcohols may be used to advantage in practically any amounts, a convenient and effective range being about one to ten volumes for each volume of aldehyde.

When the catalytic composition consists of an aldehyde (or aldehydes) and aqueous hydrogen peroxide, preferably from one to three volumes of 3% aqueous peroxide are used for each volume of aldehyde. It is convenient to use ordinary 3% commercial hydrogen peroxide not only because it is readily available, cheap and non-corrosive but also because it affords a convenient way of introducing a small amount of water into the reaction mixture which, as indicated hereinafter, is conducive to the stability of the polymerization products. Lower or higher concentrations of the peroxide can be used without deleteriously affecting the condensation. Solutions of this material in 30% concentrations are of value (when used in proper proportions) in effecting the addition of sulphur dioxide to olefins which react only sluggishly in the presence of more dilute hydrogen peroxide. With hydrogen peroxide very desirable results are obtained when the amount used constitutes 0.3 to 0.6% by weight of the olefin (i. e., 0.3 to 0.6 part by weight of pure hydrogen peroxide for each 100 parts by weight of olefin). This amounts to roughly 10-15% by volume of 3% aqueous hydrogen peroxide.

Empirical determinations which can be readily carried out will indicate the preferable procedure and catalyst with any given olefin. Experience in this field indicates that propene reacts more satisfactorily in the presence of paraldehyde and ethyl alcohol only. Cyclohexene reacts smoothly in the presence of both hydrogen peroxide and paraldehyde, and still more smoothly when ethyl alcohol is included as a third catalyst component. In the case of 2-methylpropene, pentene-1 and nonene-1, indications are that a better reaction is obtained when the hydrogen peroxide is added first, the mixture allowed to stand for about 12 hours and paraldehyde then added to the reaction mixture. Under these conditions the reaction is usually complete within an hour after the addition of the paraldehyde. Hydrogen peroxide has been found to be of particular value in instances where the olefinic substance has been freshly purified as, for example, by distillation.

The examples given herein show the formation of the sulphur dioxide-olefin polymers in a closed system which involves superatmospheric pressures. It is to be understood, however, that pressure is not critical and may be varied over wide limits. The reactions can be carried out at atmospheric pressures provided provision is made for minimizing loss of reactants by volatilization. By utilizing an apparatus provided with a reflux condenser for which the refrigerant is a material capable of maintaining a temperature of −50° C. or less (one such material being a mixture of acetone and solid carbon dioxide), the reactants can be mixed and allowed to reflux at room temperature and pressure. Pressures in excess of atmospheric are usually used. Inasmuch as pressures of 1000 atmospheres are suitable, the pressure range on its high side is limited only by the apparatus available.

Reaction temperatures are not critical. It is convenient to mix the reactants in liquid form at temperatures at which they ordinarily remain liquid and to allow the reaction mixture to slowly come back to room temperature in a sealed vessel capable of withstanding the pressures generated. The reaction temperatures are limited only by the stability of the unreacted olefin and the olefin-sulphur dioxide addition product, any temperatures not causing undesirable decomposition being satisfactory.

The addition products obtained from olefins of the general formula set out above in which Z represents an alkyl group containing more than 5 carbon atoms, are softer and more plastic than those from olefins comprising fewer carbon atoms. The products prepared under completely anhydrous conditions seem to be less stable than those prepared in the presence of small amounts of water. The products from the anhydrous reaction are dark in color and blacken quickly upon standing. Improvement in color can be obtained by washing the polymer with water. Work carried out in an effort to determine the chemical structure of the polymeric reaction products of this invention is described in the Journal of the American Chemical Society, volume 56, pages 1815–19 and volume 57, pages 1691–6 and 2311–14.

Throughout the application the parts by weight and parts by volume are in comparable units of the metric system. In Example I for instance, the volume measurements were in cubic centimeters and the weight measurements in grams. A similar ratio was utilized in the other examples.

The polymeric olefin-sulphur dioxide addition products either alone or modified with natural resins, synthetic resins, cellulose derivatives, waxes, fillers, pigments, dyes, softeners and plasticizers, find use as molding compositions, particularly in the manufacture of low cost construction elements such as baseboards, window frames, and elements for cabinet work. The olefin-polysulphones prepared herein are also useful as coating compositions when dissolved in suitable solvents, either alone or in admixture with other materials of the types enumerated above. Such compositions are useful for coating all kinds of surfaces, such as wood, metals, glass, textile fabrics, paper, stone, concrete, brick, plaster board, etc. The olefin-polysulphones, particularly those which are very high-melting and insoluble in the usual paint, varnish and lacquer solvents, are also useful as pigments and fillers.

The process of this invention is a distinct advance in the art in that olefin-sulphur dioxide polymeric addition products are obtained in better yields, more cheaply, and more conveniently than has heretofore been possible. The process is vastly superior because of its extreme simplicity, the cheapness and availability of the catalysts, and the greater stability and reproducibility of the products. The carrying out of the reaction under self-generated pressure, which is a feature of the present invention, is more advantageous than the known processes which involve passing gaseous sulphur dioxide through the liquid olefin or in which sulphur dioxide and air are alternately bubbled through the olefin. The resins have the distinct advantage of being very cheap, principally because of the low price of the raw materials and the comparatively simple mechanical manipulations involved. As is well known, olefins of the character used herein may be obtained very cheaply from cracked petroleum hydrocarbons.

As many apparently widely different embodiments of this invention may be made without departing from the spirit and scope thereof, it is to be understood that we do not limit ourselves to the specific embodiments thereof except as defined by the appended claims.

We claim:

1. Process which comprises reacting sulphur dioxide, in the presence of an aldehyde from the group consisting of aldehydes having the formula RCHO in which R represents an aliphatic hydrocarbon radical, paraldehyde, para-formaldehyde, benzaldehyde, terephthaldehyde, and p-toluic aldehyde, with an olefinic compound having the formula

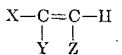

in which X is a member of the group consisting of hydrogen, methyl, and hydroxy methyl, Y is a member of the group consisting of hydrogen, methyl, hydroxy methyl, and, with Z, a saturated divalent hydrocarbon radical containing less than seven carbon atoms, and Z is a member of the group consisting of hydrogen, unsubstituted alkyl groups, alkyl groups having at least one hydrogen atom replaced by a member of the group consisting of hydroxy and cyclo aliphatic hydrocarbon and, with Y, a saturated divalent hydrocarbon radical containing less than seven carbon atoms, provided that X, Y and Z are not all alkyl groups.

2. The process set forth in claim 1 in which the aldehyde is partially oxidized paraldehyde.

3. The process set forth in claim 1 in which the reaction is carried out in the presence of hydrogen peroxide in addition to the aldehyde.

4. The process set forth in claim 1 in which the aldehyde is present in an amount equal to 5–10% by volume of the olefinic compound.

5. The process set forth in claim 1 in which the reaction is carried out at pressures in excess of atmospheric pressure.

6. The process set forth in claim 1 in which the olefinic compound and the sulphur dioxide are present in approximately equimolecular quantities.

7. Process which comprises reacting sulphur dioxide, in the presence of paraldehyde and hydrogen peroxide, with an olefinic compound having the formula

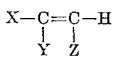

in which X is a member of the group consisting of hydrogen, methyl, and hydroxy methyl, Y is a member of the group consisting of hydrogen, methyl, hydroxy methyl, and, with Z, a saturated divalent hydrocarbon radical containing less than seven carbon atoms, and Z is a member of the group consisting of hydrogen, unsubstituted alkyl groups, alkyl groups having at least one hydrogen atom replaced by a member of the group consisting of hydroxy and cyclo aliphatic hydrocarbon and, with Y, a saturated divalent hydrocarbon radical containing less than seven carbon atoms, provided that X, Y and Z are not all alkyl groups.

8. The process set forth in claim 7 in which the olefinic compound and the sulphur dioxide are present in approximately equimolecular quantities.

9. Process which comprises introducing liquid sulphur dioxide, a liquid olefinic compound, and catalytic amounts of an aldehyde from the group consisting of aldehydes having the formula RCHO in which R represents an aliphatic hydrocarbon radical, paraldehyde para-formaldehyde, benzaldehyde, terephthaldehyde, and p-toluic aldehyde, and hydrogen peroxide at atmospheric pressure into a container, sealing said container to give a closed system, and allowing the contents thereof to reach room temperature whereby said sulphur dioxide and olefinic compound react to give a condensation product, said olefinic compound having the formula

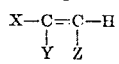

in which X is a member of the group consisting of hydrogen, methyl, and hydroxy methyl, Y is a member of the group consisting of hydrogen, methyl, hydroxy, methyl, and, with Z, a saturated divalent hydrocarbon radical containing less than seven carbon atoms, and Z is a member of the group consisting of hydrogen, unsubstituted alkyl groups, alkyl groups having at least one hydrogen atom replaced by a member by the group consisting of hydroxyl and cyclo aliphatic hydrocarbon and, with Y, a saturated divalent hydrocarbon radical containing less than seven carbon atoms, provided that X, Y and Z are not all alkyl groups.

10. The process set forth in claim 9 in which the aldehyde is partially oxidized paraldehyde.

11. The process set forth in claim 1 in which the aldehyde is partially oxidized.

12. The process set forth in claim 1 in which the aldehyde is partially oxidized benzaldehyde.

13. The process set forth in claim 1 in which the reaction is carried out in the presence of a saturated aliphatic alcohol having no more than 6 carbon atoms, in addition to the aldehyde.

14. The process set forth in claim 1 in which the reaction is carried out in the presence of hydrogen peroxide and a saturated aliphatic alcohol having no more than 6 carbon atoms, in addition to the aldehyde.

CARL S. MARVEL.
DONALD S. FREDERICK.

CERTIFICATE OF CORRECTION.

Patent No. 2,169,363.  August 15, 1939.

CARL SHIPP MARVEL, ET AL.

It is hereby certified that error appears in the printed specification of the above numbered patent requiring correction as follows: Page 1, first column, line 34, for the word "for" read from; page 5, first column, line 32, and second column, line 6, claims 1 and 7 respectively, for "hydroxy" read hydroxyl; line 35, claim 9, strike out the comma after "hydroxy"; and that the said Letters Patent should be read with this correction therein that the same may conform to the record of the case in the Patent Office.

Signed and sealed this 3rd day of October, A. D. 1939.

(Seal).

Henry Van Arsdale,
Acting Commissioner of Patents.